(12) United States Patent
Rexius (10) Patent No.: US 6,491,479 B1
(45) Date of Patent: *Dec. 10, 2002

(54) APPARATUS AND METHOD FOR APPLYING AGENT TO PARTICULATE MATERIAL

(75) Inventor: Arlen L. Rexius, Eugene, OR (US)

(73) Assignee: Express Blower, Inc., Fairfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,068

(22) Filed: Mar. 14, 2000

Related U.S. Application Data (63) Continuation-in-part of application No. 08/929,740, filed on Sep. 15, 1997, now Pat. No. 6,036,406.

(51) Int. Cl.$^7$ .................................................... B60P 1/60
(52) U.S. Cl. ............................ 406/39; 406/43; 406/48; 406/53; 406/56; 406/79; 406/139
(58) Field of Search ............................ 406/43, 48, 79, 406/80, 53, 56, 57, 60, 139

(56) References Cited

U.S. PATENT DOCUMENTS

| | | |
|---|---|---|
| 1,792,590 A | 2/1931 | Kirk |
| 1,928,859 A | 10/1933 | Kutscha |
| 2,497,295 A | 2/1950 | Cavallier |
| 2,694,496 A | 11/1954 | Atkinson |
| 2,715,972 A | 8/1955 | Grygiel |
| 2,748,990 A * | 6/1956 | Kemper ...................... 137/202 |
| 2,791,339 A | 5/1957 | Sprague |
| 2,988,368 A | 6/1961 | Kerr |
| 3,077,365 A * | 2/1963 | Fisher .......................... 302/28 |
| 3,602,394 A | 8/1971 | McCune |
| 3,602,404 A | 8/1971 | Frank |
| 3,679,082 A | 7/1972 | Gramlich |
| 3,764,043 A * | 10/1973 | Wright ......................... 222/55 |
| 3,806,001 A * | 4/1974 | Pratt ............................. 222/1 |
| 3,954,303 A * | 5/1976 | Boring ......................... 302/62 |
| 4,219,966 A | 9/1980 | McCalister |
| 4,249,838 A | 2/1981 | Harvey et al. |
| 4,265,737 A * | 5/1981 | Smith et al. .................... 209/3 |
| 4,288,008 A * | 9/1981 | Amblard et al. ............ 111/130 |
| 4,296,970 A * | 10/1981 | Hodges ........................ 299/67 |
| 4,345,858 A * | 8/1982 | Barlow ......................... 406/34 |
| 4,352,267 A * | 10/1982 | Mellinger ..................... 56/341 |
| 4,372,751 A * | 2/1983 | Chapman et al. ................ 44/2 |
| 4,583,487 A * | 4/1986 | Wood .......................... 118/308 |
| 4,589,234 A * | 5/1986 | Rebhan et al. .............. 222/241 |
| 4,618,294 A * | 10/1986 | Brown ......................... 406/113 |

(List continued on next page.)

FOREIGN PATENT DOCUMENTS

| | | |
|---|---|---|
| AU | 251169 | 5/1963 |
| JP | 166233 | 10/1982 |
| JP | 256419 | 10/1989 |
| SU | 178596 | 3/1966 |

OTHER PUBLICATIONS

Mulch Coloring Equipment advertisement, *BioCycle*, Oct. 1996, p. 88.

Rotochopper advertisement, *BioCycle*, May 1998, p. 60.

*Primary Examiner*—Donald P. Walsh
*Assistant Examiner*—Jeffery A Shapiro
(74) *Attorney, Agent, or Firm*—Christensen O'Connor Johnson Kindness PLLC (57) ABSTRACT

An apparatus and method for dispensing and distributing loose particulate material includes a system for applying an agent to the loose particulate material. In one embodiment, the apparatus includes a container for holding and transporting the loose particulate material to the site of application. A feeder regulates the flow of loose particulate material out of the container. Loose particulate material exiting the feeder is blown out of the apparatus through a hose by an air stream produced by a blower. An agent is introduced via a carrier fluid to the air stream carrying the loose particulate material, whereby the resulting mixture of the agent with the carrier fluid is then mixed with the loose particulate material carried by the air stream.

18 Claims, 10 Drawing Sheets

U.S. PATENT DOCUMENTS

| | | | |
|---|---|---|---|
| 4,717,308 A | | 1/1988 | Kuhns |
| 4,773,960 A | | 9/1988 | Vincelli et al. |
| 4,793,742 A | | 12/1988 | Strand |
| 4,850,750 A | * | 7/1989 | Cogbill et al. ............... 406/82 |
| 4,944,347 A | * | 7/1990 | Richard et al. ............. 166/278 |
| 5,035,543 A | * | 7/1991 | Medemblik et al. .......... 406/39 |
| 5,080,534 A | * | 1/1992 | Goodson et al. .............. 406/46 |
| 5,125,583 A | * | 6/1992 | Strand ........................ 239/655 |
| 5,181,804 A | | 1/1993 | Wysong et al. |
| 5,192,587 A | | 3/1993 | Rondy |
| 5,269,635 A | * | 12/1993 | Taylor, Jr. ..................... 406/10 |
| 5,303,998 A | * | 4/1994 | Whitlatch et al. .............. 366/3 |
| 5,361,711 A | | 11/1994 | Beyerl |
| 5,403,128 A | * | 4/1995 | Thomas ........................ 406/39 |
| 5,507,602 A | * | 4/1996 | Walker ....................... 406/122 |
| 5,526,957 A | * | 6/1996 | Brown et al. ................ 222/105 |
| 5,538,286 A | * | 7/1996 | Hoff ............................ 280/837 |
| 5,549,421 A | * | 8/1996 | Reinhardt et al. .............. 406/3 |
| 5,556,237 A | | 9/1996 | Rexius |
| 5,567,048 A | * | 10/1996 | Hammonds ................. 220/232 |
| 5,634,713 A | * | 6/1997 | Abe ........................... 366/102 |
| 5,647,696 A | * | 7/1997 | Sperber ....................... 406/56 |
| 5,775,852 A | * | 7/1998 | Boutte et al. ................. 406/32 |
| 5,795,108 A | * | 8/1998 | Lightle ........................ 406/48 |
| 5,904,303 A | * | 5/1999 | Egli ........................... 239/654 |
| 5,955,037 A | * | 9/1999 | Holst et al. ................. 422/171 |
| 6,012,875 A | * | 1/2000 | Goettelmann et al. ...... 406/144 |
| 6,036,406 A | * | 3/2000 | Rexius ......................... 406/39 |
| 6,065,686 A | * | 5/2000 | Betts-Willams et al. .... 222/617 |
| 6,220,790 B1 | * | 4/2001 | Schenk et al. ................. 406/3 |

* cited by examiner

APPARATUS AND METHOD FOR APPLYING AGENT TO PARTICULATE MATERIAL

This application is a continuation-in-part of application Ser. No. 08/929,740 filed Sep. 15, 1997 now U.S. Pat. No. 6,036,406.

FIELD OF THE INVENTION

The present invention is an improvement to methods and apparatus used to pneumatically dispense and distribute loose particulate material. The improvement provides methods and apparatus for applying agents onto loose particulate material carried by an air stream for dispensing and distribution.

BACKGROUND OF THE INVENTION

A number of industries, including the forest by-products, landscaping, and playground industries have long been in need of efficient methods and apparatus for transporting, dispensing and distributing non-free-flowing or loose particulate materials. An exemplary but non-exclusive list of commonly distributed non-free-flowing or loose particulate materials includes loose bark, wood chips, sawdust, compost, etc. Applications for such materials include residential and commercial landscaping and playground installations.

As society recognizes the increased need to improve the safety of playgrounds, it is increasingly important to cover areas surrounding playground equipment with a cushioning material. Such materials cushion a child's fall thus reducing the occurrence of injuries. Some of the commonly used playground cushioning materials include loose bark, wood chips, sawdust, rubber particles, etc.

In the past, it had been difficult to safely and efficiently transport and apply loose particulate materials to the application site. Loose particulate materials are generally trucked on site in a dump truck, unloaded and then distributed manually using wheelbarrows, shovels, rakes, etc. To increase the efficiency of the distribution process, the present inventor first invented a container truck to transport and distribute loose particulate materials. The container truck includes an open top through which the truck can be filled using a front-end loader or other loading equipment. The container truck includes a moving floor or conveyor. The moving floor moves loose particulate material within the container into a material feeder at the rear of the container. The material feeder provides a regulated flow of loose particulate material into an air stream from a powerful blower. Loose particulate material exiting the feeder mixes with the air stream from the blower and is blown out of the container through an attached hose. An operator applies loose particulate material by pointing the free end of the hose at the location, where the loose particulate material is desired.

Although the inventor's first invention dramatically increases the efficiency of the dispensing and distribution process, it had room for further improvements. The moving floor sometimes moves loose particulate material over the feeder so that it "bridges," e.g., blocks the passageway to the feeder, thus preventing material from entering the feeder. An operator must then enter the container truck to break up the loose particulate material so that it falls into the feeder.

In order to prevent bridging or blocking of the feeder, a second operator is located within the container to redistribute or break up the loose particulate material. However, placing an operator within the container is not desirable because the operator is located adjacent to dangerous equipment including the moving floor and feeder. In addition to increasing the possibility of injury, the use of two operators adds to overall distribution costs.

Another concern identified during the operation of the container truck was the production of a great deal of airborne particles. Blowing dry loose particulate materials such as wood chips or sawdust creates a large quantity of airborne particles or dust. The airborne particles create an unpleasant working environment for the operator and people within the vicinity of the application process. In addition, the Environmental Protection Agency (EPA) is investigating whether airborne particles present health concerns for operators or bystanders. The EPA has urged the industry to research methods to distribute dry loose particulate materials without creating large quantities of airborne particles.

Having solved the aforementioned problems in U.S. Pat. No. 5,556,237, the inventor of the present invention has redirected his efforts to another problem. The inventor, having realized that the choice of a proper loose particulate material is heavily influenced by its aesthetic qualities, not the least of which is its colored appearance, has developed a method and apparatus for applying agents onto the loose particulate material cooperatively with the pneumatic dispensing and distributing operation. As a general proposition, consumers prefer dark colors, such as for example, wood chips made from the bark of trees. Unfortunately, much of the wood products which are recycled to make wood mulch or chips do not come from bark, but rather from the lighter tree core. The supply of dark wood is regrettably in short supply. In order to enhance the marketability of the lighter wood products, it is desirable to enhance the aesthetic qualities of the wood chips by dyeing the chips. Rondy (U.S. Pat. No. 5,192,587) for instance, discloses a rotating helical screw conveyer with a reservoir containing a coloring agent in the lower section of the screw conveyer housing. However, devices similar to these further necessitate the loading and transporting of the colored wood chips onto another vehicle for transportation to its ultimate application site. Therefore, the present invention makes use of the dispensing and distributing device to advantageously combine the dyeing operation with the dispensing operation. In addition, the inventor has discovered that virtually any agent which is desirable to be mixed with loose particulate material may be a candidate for this new apparatus and method.

Thus, a need exists in the industry for methods and apparatus to distribute loose particulate materials while enhancing the properties of those materials simultaneously with the distribution and dispensing operation. The present invention is directed towards fulfilling some of these needs.

SUMMARY OF THE INVENTION

The present invention is an apparatus and method for applying an agent onto loose particulate material in conjunction with the dispensing and distributing of the loose particulate material. In one embodiment, the apparatus includes a container for holding and transporting the loose particulate material to the site of application. A feeder regulates the flow of loose particulate material out of the container. Loose particulate material exiting the feeder is blown out of the apparatus through a hose by an air stream produced by a blower. In accordance with the present invention, an agent is introduced via a carrier fluid into the air stream carrying the particulate material, whereby the resulting mixture of the agent with the carrier fluid is then mixed with the loose particulate material carried by the air stream.

The introduction of an agent to the air stream carrying the loose particulate material reduces the number of operations required to produce a finished product. Whereas previously, agents such as coloring dyes, fertilizers, fumigants, microorganisms and pesticides have been applied in a distinct and separate operation, unrelated to the dispensing step, the present invention makes use of a carrier fluid to include desirable agents into the dispensing step, thus accruing savings for operators who pass the savings to the consumer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
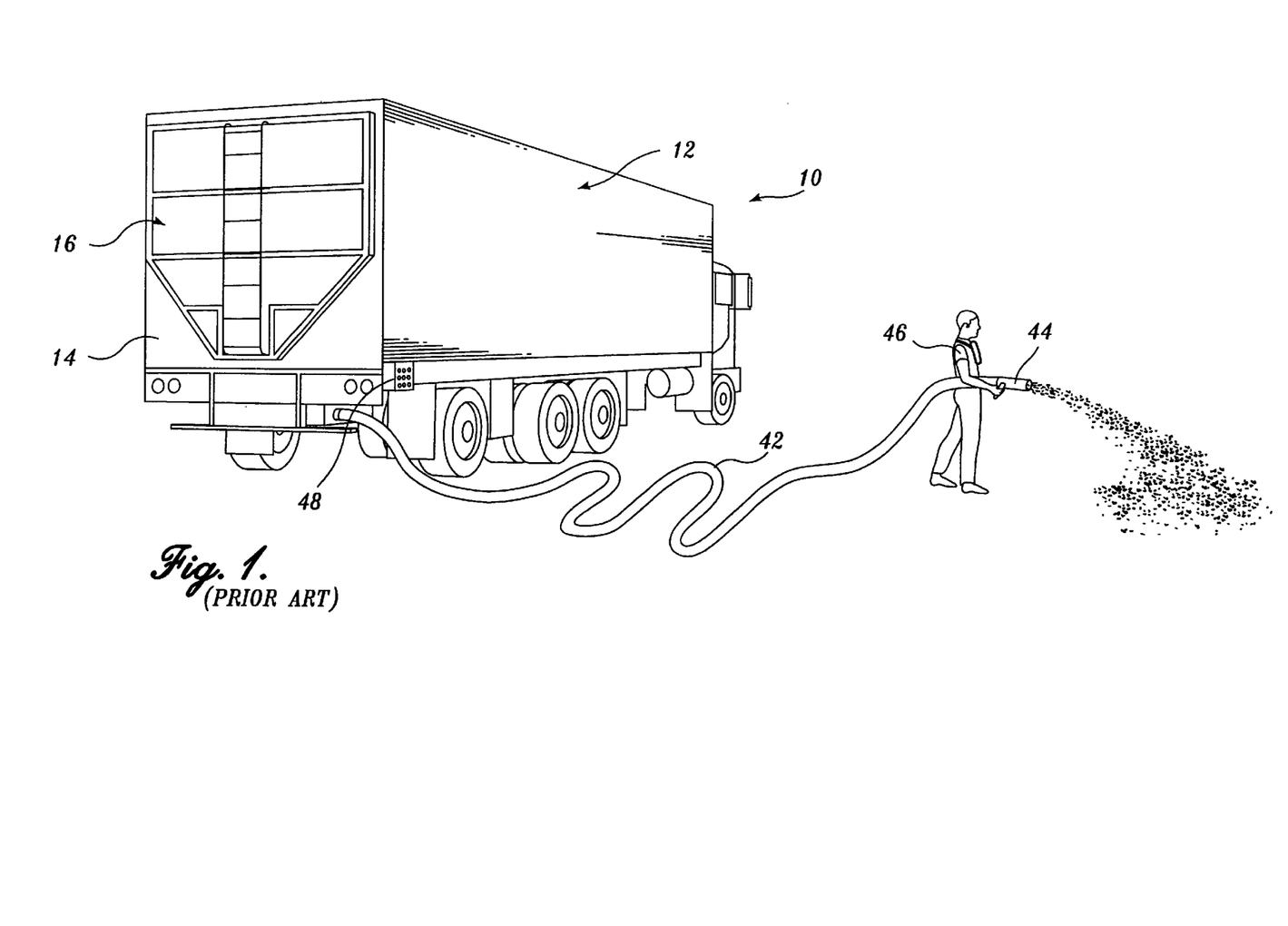
FIG. 1 is a perspective view of a container truck described in U.S. Pat. No. 5,556,237, attached hose and operator distributing loose particulate material in accordance with the present invention.
Figure 2:
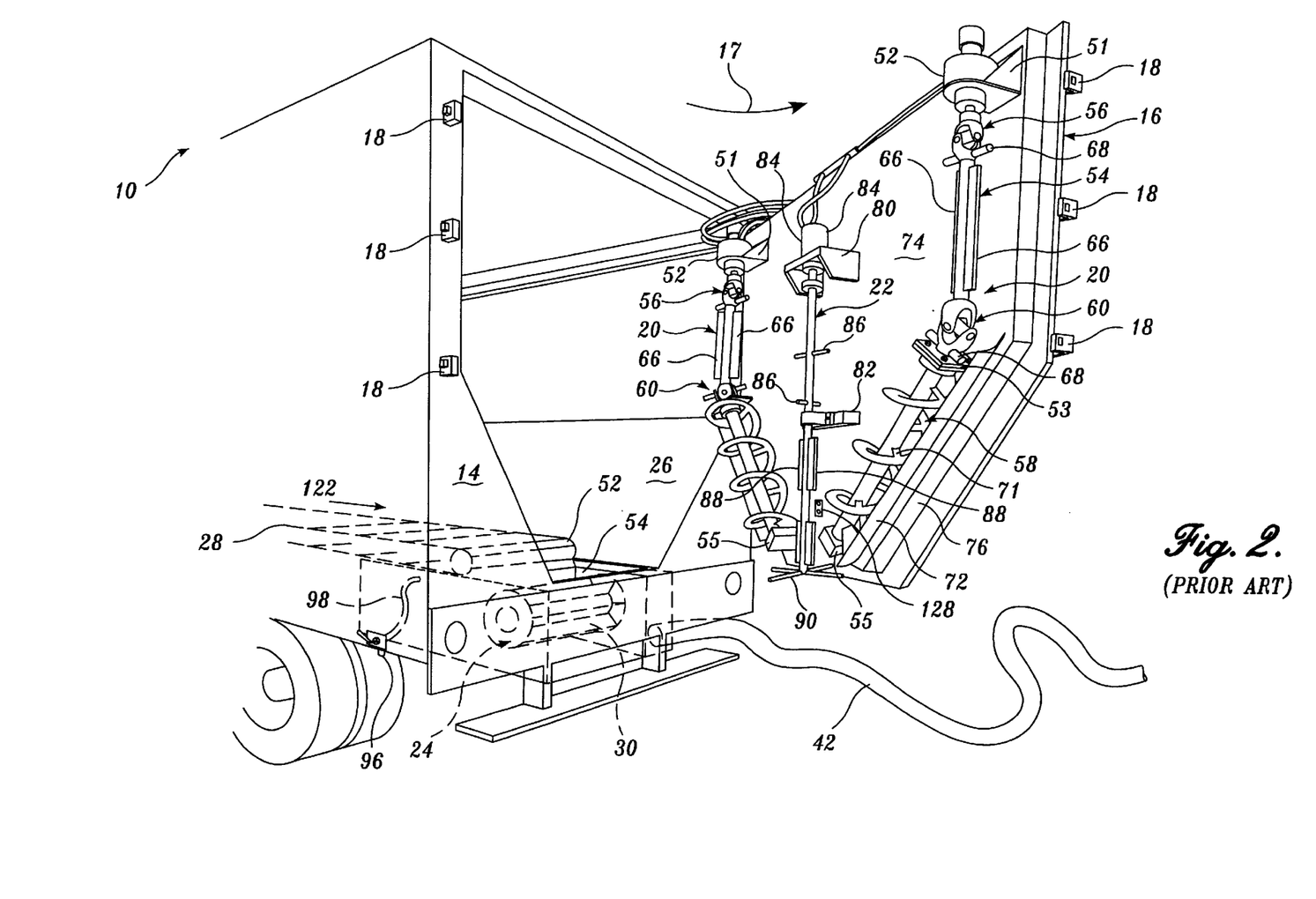
FIG. 2 is a perspective view of the rear portion of the container truck of FIG. 1 illustrating the augers, mixer and feeder.

An exemplary container for holding and dispensing loose particulate material is described in U.S. Pat. No. 5,556,237, which is herein incorporated by reference and described below. The container truck 10 including a dispensing and distributing apparatus is illustrated in FIG. 1. The container truck includes a trailer or material container 12. The container 12 may be part of the truck 10 or it may be a detachable trailer. The container 12 is preferably a five-sided box having an open top or roof through which loose particulate material may be loaded using a front-end loader or other appropriate loading equipment. The container 12 includes a door 16 that takes up a large portion of the rear wall 14 of the truck. The door 16 is hinged on one side so that it may swing open in an arc away from the rear wall of the truck as shown by arrow 17 (FIG. 2). The opposite side of the door 16 is releasably fastened to the rear of the truck using a plurality of locking fasteners 18.

Two opposing augers 20 and a centrally located mixer 22 are rotatably mounted on the inner surface 74 of the door 16. A cylindrical feeder 24 is rotatably mounted beneath an inclined floor 26 of the container 12 directly beneath the mixer 22. When the door 16 is closed and locked, the augers 20 and mixer 22 are positioned to feed loose particulate material within the container 12 into the cylindrical feeder 24. The loose particulate material within the container 12 is also fed to the feeder 24, augers 20 and mixer 22 by a moving floor or conveyor 28 located at the bottom of the floor 26.

Figure 5:
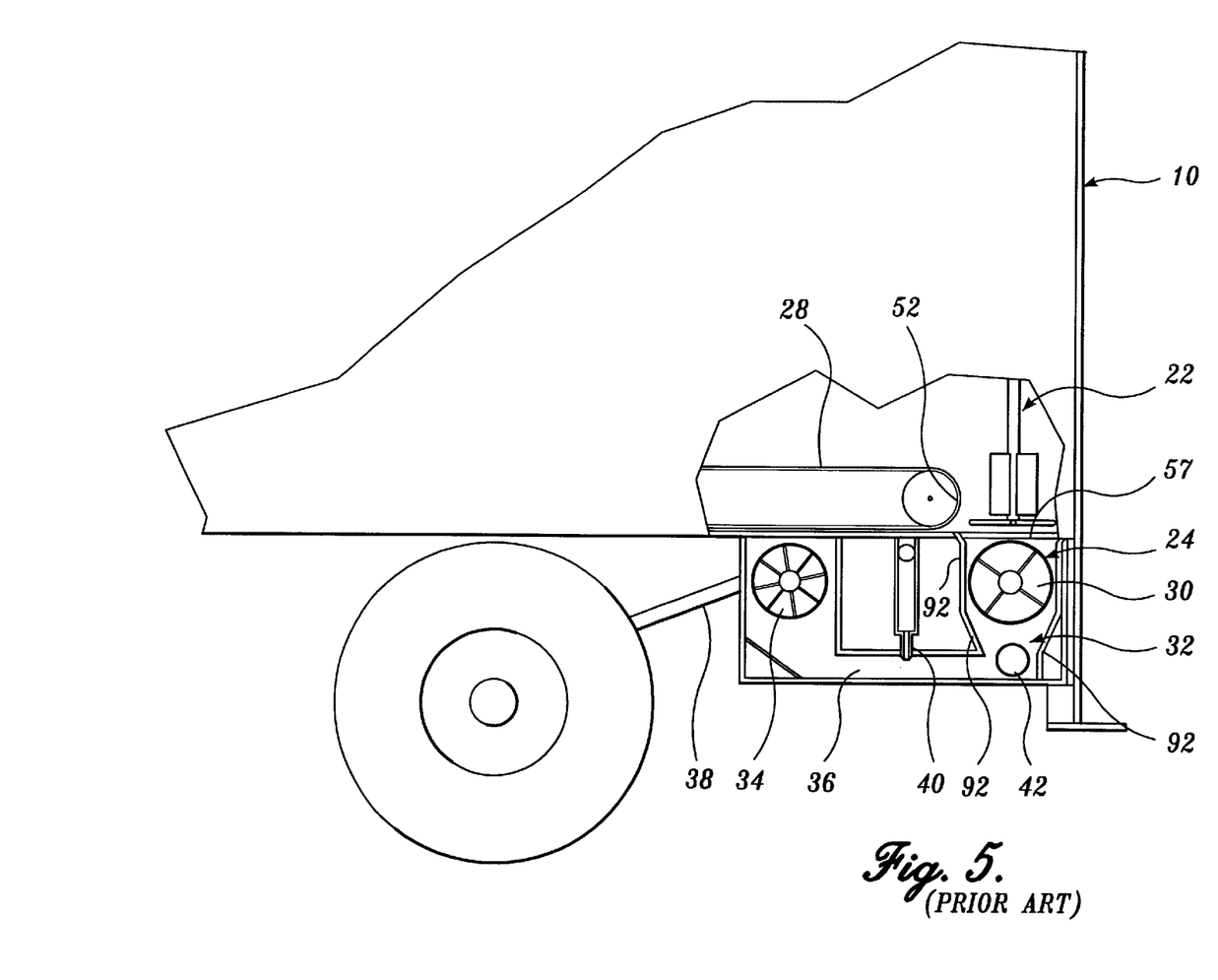
FIG. 5 is a side, partial cutaway view of the container truck illustrating the blower and feeder mechanism.

The feeder 24 includes a plurality of radially extending longitudinal walls forming individual divided chambers 30 spaced around its circumference (FIGS. 2 and 5). As the feeder rotates, the chambers 30 drop a predetermined quantity of loose particulate material from the container 12 into the top of a mixing chamber 32 (FIGS. 5 and 6) located directly beneath the feeder 24. One side of the mixing chamber 32 is connected to a blower 34 by ducting 36 while the opposite side is connected to a hose 42.

Figure 6:
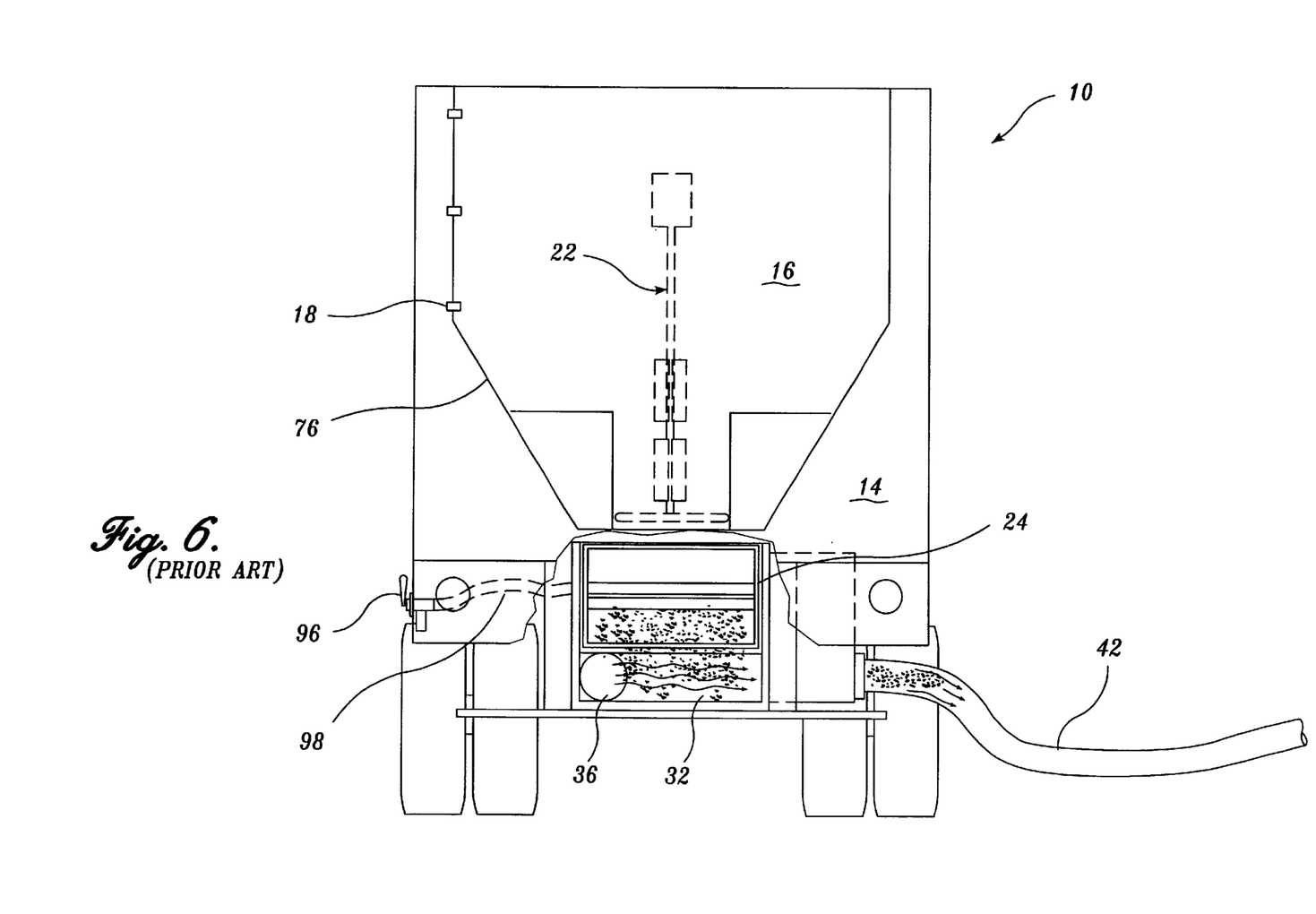
FIG. 6 is a rear, partial cutaway view of the container truck illustrating the blower and feeder mechanism.

As described in detail below, during operation, the blower 34 forces a large volume of high velocity air through the ducting 36. As the air flows through the ducting 36, water is preferably injected into the air stream through a water nozzle 40 extending into the air stream. The water atomizes upon contact with the air stream, forming a mist. The resulting moist air stream enters one side of the cavity 32, and mixes with loose particulate material dropped into the top of the cavity 32 by the feeder 24. The combined stream of air, water and loose particulate material exits the chamber 32 through a hose 42 connected to the opposite side of the chamber (FIG. 6). The loose particulate material is blown through the length of the hose 42 and exits at a free end 44 that is manipulated by an operator 46 (FIG. 1). Upon exiting the hose 42, the loose particulate material settles upon the location at which the operator 46 points the free end 44 of the hose.

The operator 46 controls the flow of loose particulate material through the hose 42 using either a local control panel 48 (FIG. 1) mounted on the side of the container 12 or a remote transmitter control panel 50. Both control panels 48 and 50 allow the operator to control the speed of the blower 34 and feeder 24 to increase or decrease the volume of loose particulate material being applied.

The individual parts and operation of the dispensing and distributing device will now be discussed in greater detail. As discussed above, the interior of the container 12 is filled by loading loose particulate material into the top of the container using a front-end loader or other loading equipment. As loose particulate material is dispensed from the rear of the container, additional loose particulate material is transported from the front of the container to the rear of the container by the moving floor.

As best seen in FIG. 2, the moving floor or conveyor 28 is mounted on the floor of the container centered between the inclined sides of the floor 26, commonly referred to as a V-bottom container. The inclined sides of the floor 26 slope upward from the opposing edges of the moving floor 28 until they contact the vertical sides of the container. The rear end of the moving floor terminates adjacent the forward edge of an opening 57 in the floor of the container.

Figure 9:
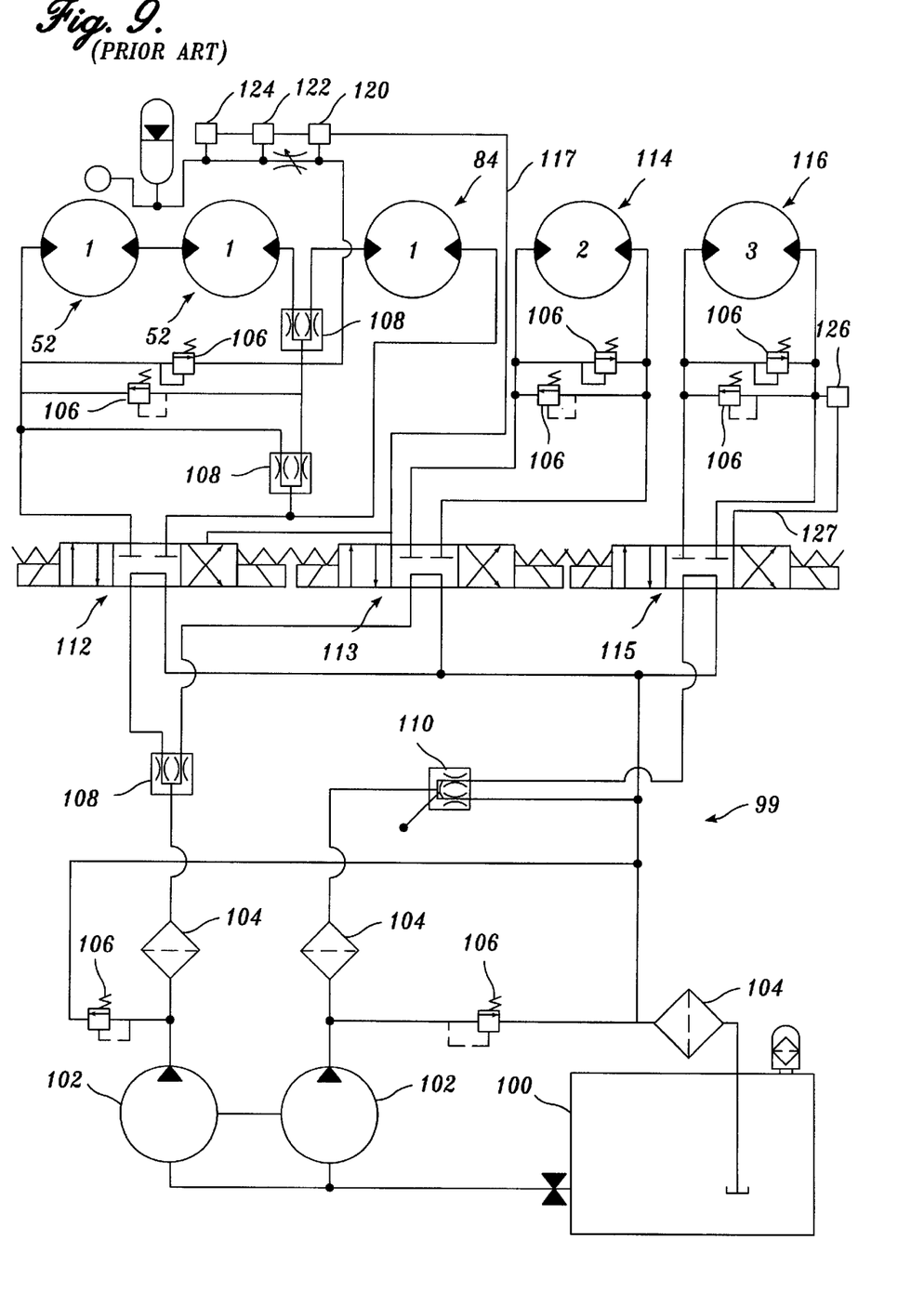
FIG. 9 is a hydraulic schematic of the hydraulic control system of the container truck of FIG. 1.

The moving floor or conveyor 28 moves the load of particulate matter within the container forward or rearward within the container in response to a hydraulic control system 99 (FIG. 9). The moving floor 28 may be a continuous belt conveyor or other types of conveyors known to those of ordinary skill in the art. The moving floor 28 may include 12-inch overlapping belt sections that are bolted to two opposing edge drive chains and a center drive chain.

The moving floor's movement is controlled by a hydraulic control system 99 (FIG. 9) as described below. The moving floor 28 may be started or stopped using either of the local or remote control panels 48 and 50. The moving floor's movement may also be controlled automatically by a hydraulic or electric load sensing system as discussed below.

When loose particulate material transported by the moving floor 28 reaches the rear end of the moving floor 28 it is moved into contact with the opposing augers 20 and mixer 22 (FIG. 2). Each auger 20 is rotatably attached to the inner surface 74 of the door 16 by an upper bracket 51, a central bracket 53, and a lower bracket 55. Each auger 20 is rotatably driven by a hydraulic motor 52 that is attached to the upper bracket 51. Each hydraulic motor 52 rotates the augers in response to inputs from the hydraulic control system (FIG. 9).

Each hydraulic motor 52 is attached to a straight shaft 54 of the respective auger by a first universal joint 56 (FIG. 2). Each straight shaft 54 extends downward from the hydraulic motor 52 parallel to the edge of the door 16. The opposite end of each straight shaft 54 is attached to an inclined shaft 58 by a second universal joint 60. The inclined shaft 58 extends downward parallel to the inclined edge 76 of the door 16. The upper and lower ends of the inclined shaft 58 are rotatably mounted to the inner surface 74 of the door using bearings in the L-shaped central bracket 53 and the lower bracket 55, respectively.

Figure 3:
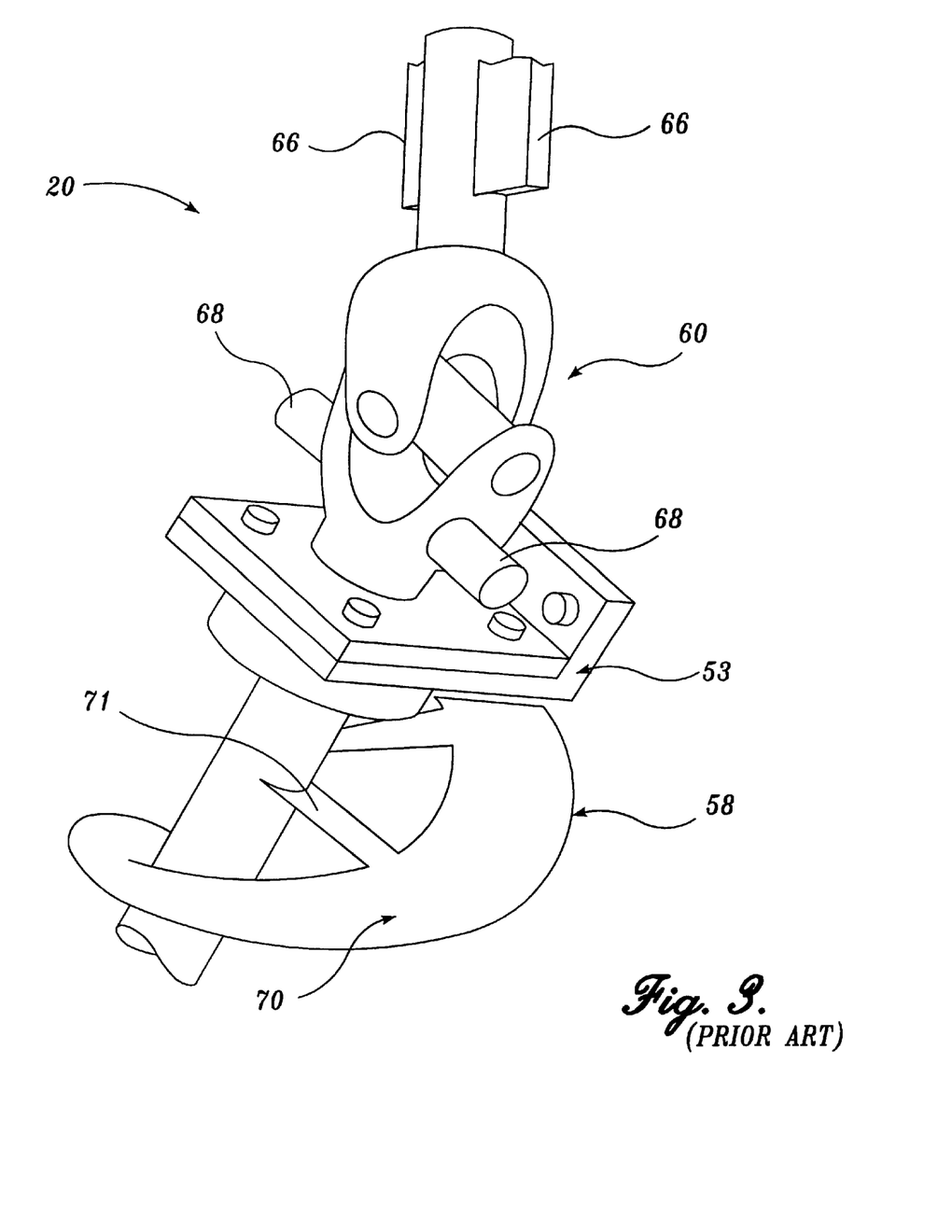
FIG. 3 is an enlarged, perspective view of a portion of one of the augers of FIG. 2.

The augers 20 are used to break up and feed loose particulate material within the container to the mixer 22 and feeder 24. To assist in breaking up the loose particulate material, each straight shaft 54 includes two opposing radially extending paddles 66. In addition, both universal joints 56 and 60 include radially extending opposing rods 68 (FIGS. 2 and 3).

Figure 4:
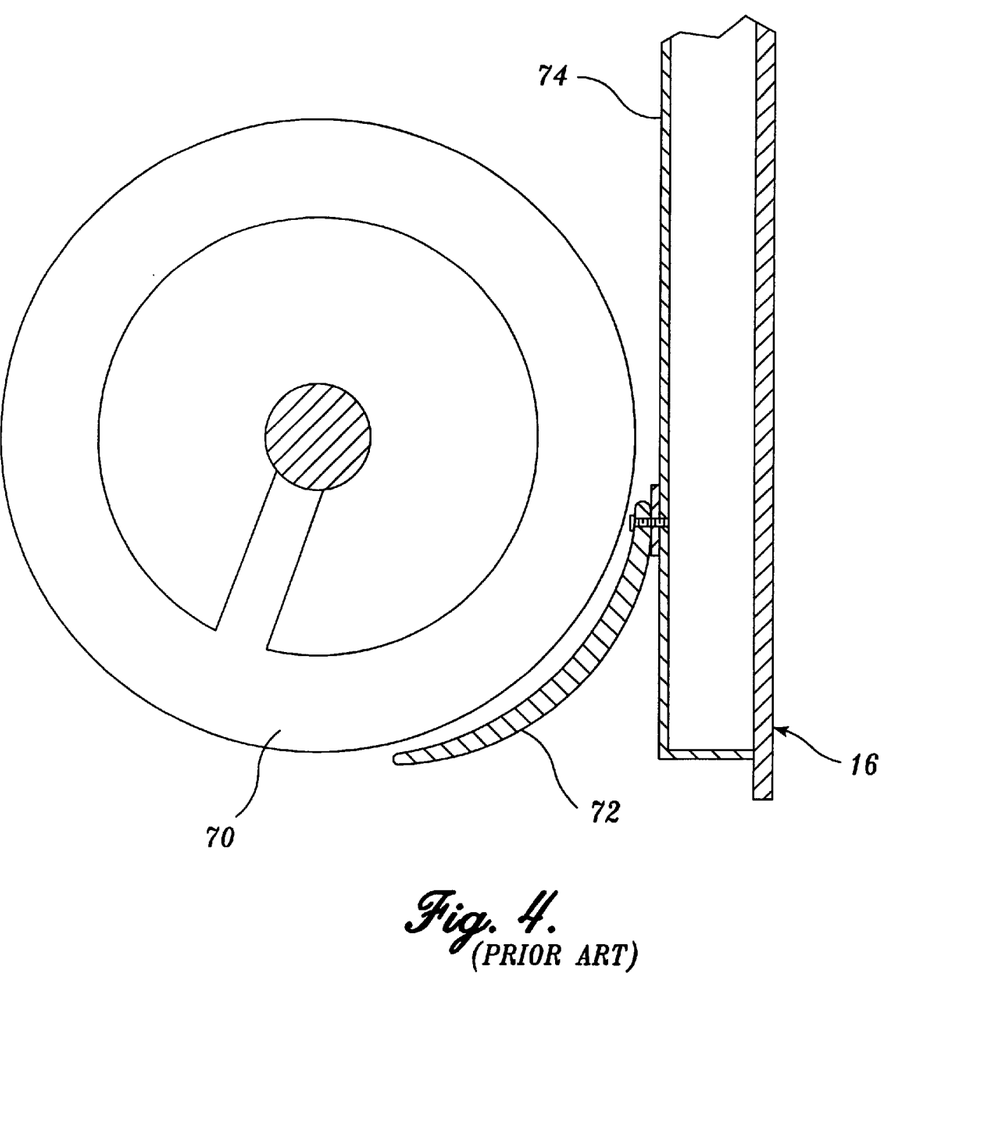
FIG. 4 is a cross section of the lower section of one of the augers of FIG. 2.

Each inclined shaft 58 includes a ramp 70 (FIG. 2) that spirals downward over the length of the shaft. Each ramp 70 is spaced radially outward from the surface of the shaft 58 by a plurality of radial arms 71. As the augers 20 rotate, the ramps 70 carry loose particulate material downward along the inclined floor 26 into the opening 57. Preferably, flange 72 (FIGS. 2 and 4) is mounted outboard of the ramp 70 parallel to the inclined edge 76 to prevent loose particulate material from being forced into gaps between the edge of the door 16 and the rear wall 14 of the container. The flange 72 is bolted or otherwise fastened to the inner surface 74 and curves outward approximately parallel to the cylindrical plane established by the circumference of the ramp 70.

As loose particulate material is fed into the opening 57, it passes through the mixer 22. The mixer 22 is centered between the two augers 20 and rotatably attached to the inner surface of the door 16 by bearings located at its upper end in a bracket 80 and at its mid-span in a bracket 82. The mixer 22 is rotatably driven by a hydraulic motor 84 attached to its upper end. The hydraulic motor 84 rotates the mixer 22 in response to inputs from a hydraulic control system 99 (FIG. 9). A plurality of rods 86 (FIG. 2) and paddles 88 extend radially outward from the center of the mixer 22 to assist in breaking up loose particulate material within the container 12. The lower end of the mixer 22 terminates at two perpendicular, radially extending mixing rods 90. The mixing rods 90 are located directly above the opening 57 in the floor when the door 16 is closed and fastened.

As loose particulate material is moved rearward by the moving floor 28, it is broken up and directed into the mixing rods 90 by the augers 20 and moving floor 28. The mixing rods 90 help to break up and loosen the loose particulate material as it is forced through the opening 57 by the augers, thus avoiding "bridging" of the fill material over the opening of the feeder. The broken up loose particulate material is funneled downward into the individual chambers 30 of the feeder 24 by ducting 92.

The ducting 92 is sized to feed loose particulate material into the chambers 30 while preventing loose particulate material from falling between the feeder 24 and the ducting into the mixing chamber 32. The ducting 92 and feeder 24 form an air lock between the mixing chamber 32 and the interior of the container 12. The air lock prevents air being blown through the mixing chamber 32 from blowing upward through the feeder and into the interior of the container.

The feeder 24 is rotatably mounted within the ducting 92 and is driven by a hydraulic motor (not shown) controlled by the hydraulic control system 99 (FIG. 9). As the feeder 24 is rotated, loose particulate material within each chamber 30 is rotated downward until it falls into the top of the mixing chamber 32 (FIGS. 5 and 6). As the feeder 24 feeds loose particulate material into the top of the mixing chamber 32, the blower 34 forces a high speed stream of air into one side of the mixing chamber through ducting 36.

The blower 34 may be any type of blower capable of producing high speed air flow. The blower 34 may be driven by a power takeoff 38 from the truck's engine or may be driven by a separate drive mechanism (not shown). As the blower provides a high speed air stream through the ducting 36, water may be introduced into the air stream by the water nozzle 40 (FIG. 5). The water nozzle 40 is connected to an external water valve 96 (FIG. 2) by a hose 98.

During operation, the water valve 96 is connected to a water supply through the use of a hose (not shown). Preferably, the water supply is a tank mounted on the container truck 10. However, the water supply may come from an existing source, such as a faucet. The water flows through the water valve 96, hose 98 and nozzle 40 into the air stream produced by the blower 34. As the water exits the nozzle 40, it is atomized by the air stream flowing through the ducting 36, producing a mist. The resulting water laden air stream flows into one side of the mixing chamber 32 (FIGS. 5 and 6). As the air stream enters the mixing chamber, it mixes with the loose particulate material entering the top of the mixing chamber. The water within the air stream mixes with the loose particulate material reducing the amount of loose dust or particles produced by the high velocity air stream contacting the loose particulate material. The loose particulate material is then blown out the opposite side of the mixing chamber 32 into the hose 42 (FIG. 6). The air stream produced by the blower blows the loose particulate material through the length of the hose 42 until it exits the free end 44 (FIG. 1). As illustrated in FIG. 1, an operator 46 may manipulate the free end 44 of the hose in order to place loose particulate material wherever desired.

Figure 7:
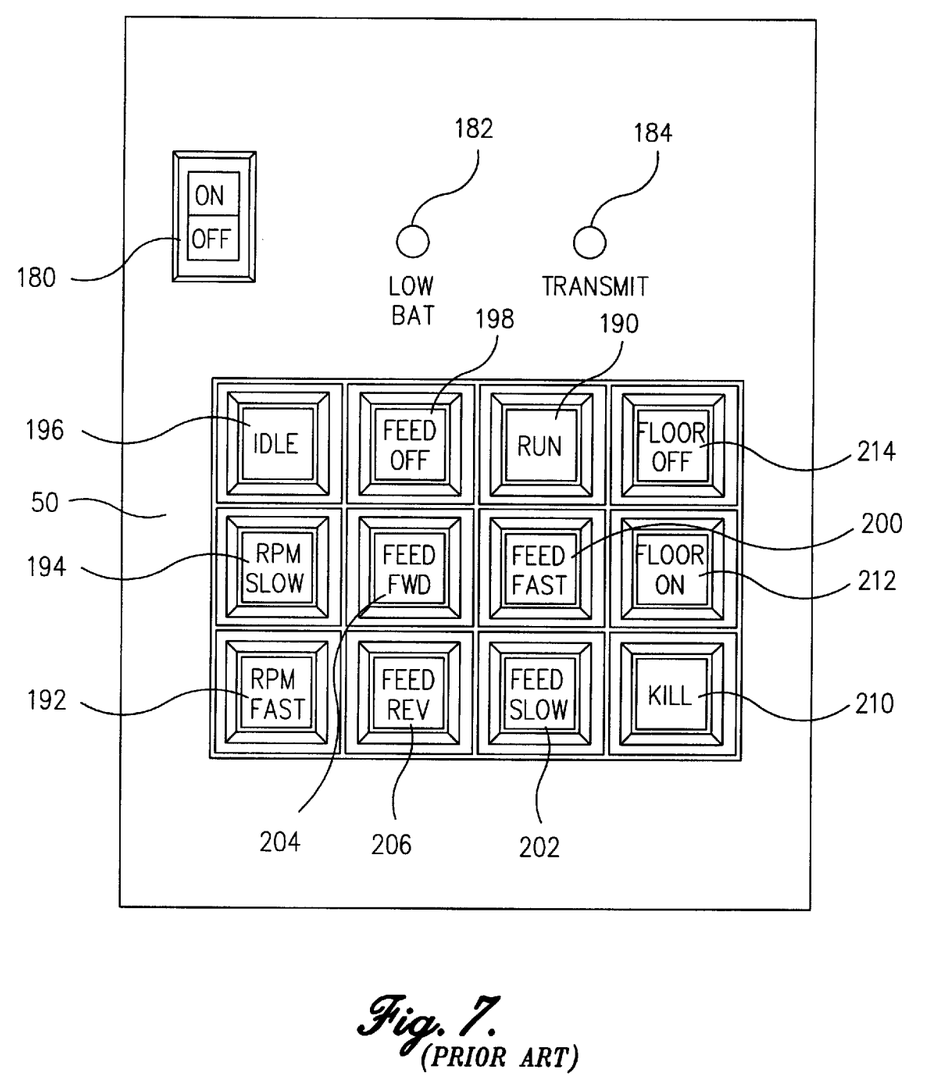
FIG. 7 is a top plan view of the remote transmitter for controlling the blower and feeder mechanism.

The operation of the container truck is controlled by the operator using either the local control panel 48 (FIG. 8) or the remote transmitter control panel 50 (FIG. 7). Using the control panels 48 or 50, the operator may control the operation of the truck's hydraulic control system 99 illustrated in FIG. 9. The hydraulic control system 99 includes a central hydraulic fluid reservoir 100, two fluid pumps 102, appropriate high pressure filters 104, constant pressure valves 106, flow dividers 108, and flow control valves 110, 112, 113, and 115 as illustrated in FIG. 9 and as understood by those of ordinary skill in the art. The hydraulic control system controls the operation of the hydraulic motors 52 (FIGS. 2 and 9) operating the augers 20 and the hydraulic motor 84 operating the mixer 22. The hydraulic control system also controls the hydraulic motor 114 that operates the moving floor 28 and the hydraulic control motor 116 that operates the feeder 24.

The hydraulic control system includes a first pressure sensor 120, a second pressure sensor 122, and a third pressure sensor 124. The sensors 120, 122 and 124 are electrically hard wired into the control valves 112 and 113 that control the operation of the motor driving the moving floor 28, augers 20, and mixer 22 by wiring 117. The first pressure switch 120 senses when there is a low hydraulic pressure in the hydraulic control loop driving the augers 20 and mixer 22. Such a low hydraulic pressure is present when the augers 20 and mixer 22 are free-wheeling or moving only a small quantity of loose particulate material within the container. Under such circumstances, the low pressure sensor 120 sends a signal to the control valve 113, instructing the valve to open, thus starting the hydraulic motor 114. When the hydraulic motor 114 starts, the moving floor 28 moves clockwise as illustrated by arrow 123 (FIG. 2). This moves additional loose particulate material within the container into contact with the augers 20 and mixer 22.

As loose particulate material moves into contact with the augers 20 and mixer 22, resistance to the movement of the augers and mixer increases, thus increasing the hydraulic pressure in the system driving the motors 52 and 84. When the hydraulic pressure reaches a predetermined level, the second pressure sensor 122 is triggered. Triggering the second pressure switch 122 provides a signal to the control valve 113 instructing the valve to close, thus stopping the movement of the moving floor 28.

If too large a quantity of loose particulate material is provided to the augers 20 and mixer 22 it is possible that the augers or mixer could jam. In such circumstances, a sufficiently large hydraulic pressure is developed within the hydraulic system to trigger the third pressure sensor 124. Triggering the third pressure sensor 124 sends a signal to the control valve 112 instructing it to reverse the direction of movement of the hydraulic motors 52 and 84. Reversing the augers 20 and mixer 22 moves loose particulate material away from the feeder 24, thus helping to relieve the jammed condition.

The hydraulic control system 99 also includes a fourth pressure sensor 126 which is used to help prevent stalling or jamming of the hydraulic motor 116 that operates the feeder 24. When the hydraulic pressure reaches a predetermined condition, representative of excessive resistance to movement of the motor 116, the fourth pressure sensor 126 is triggered. This sends an electrical signal to the valve 115 controlling the motor 116 via an electrical cable 127. The signal instructs the valve 115 to either close or reverse the rotation of the motor 116, thus helping to relieve the jammed condition.

Alternatives could replace or supplement the hydraulic pressure sensors 120, 122, 124 and 126 with a photoelectric sonar or other type of sensor 128 (FIG. 2). In such alternatives, the photoelectric or other type of sensor 128 is used to detect the level of loose particulate material at the rear of the container using light, sound, etc., depending on the type of sensor. The sensor 128 thus provides an indication of the amount of loose particulate material fed into the augers. This indication is used to control the operation of the moving floor 28 to ensure that the proper amount of loose particulate material is being fed into the augers 20 and mixer 22.

Figure 8:
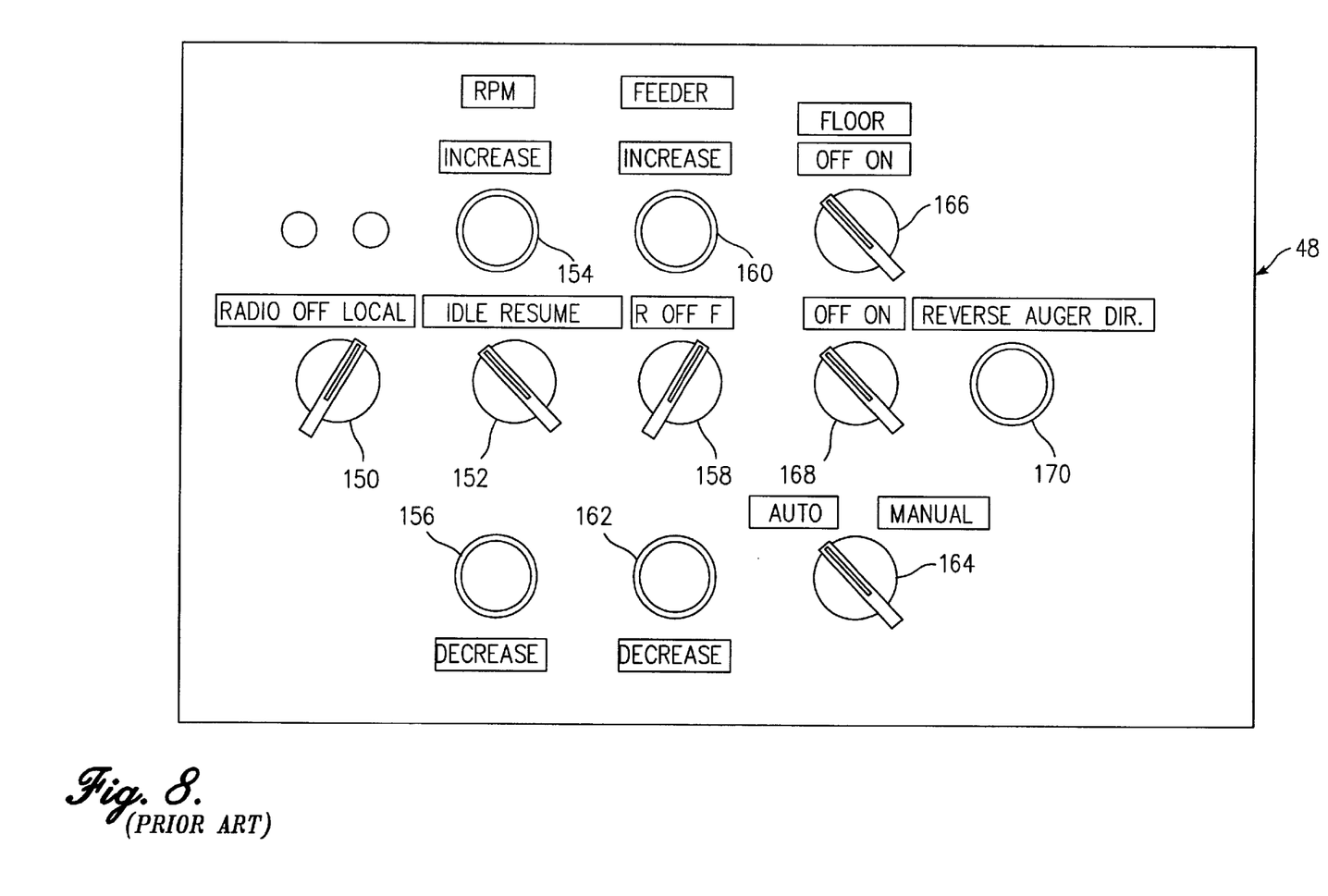
FIG. 8 is a top plan view of the local control panel for controlling the blower and feeder mechanism.

An operator controls the operation of the hydraulic control system 99 and the truck's engine RPM using either the local control panel 48 or remote transmitter control panel 50. The hydraulic control system in turn controls the augers 20, mixer 22, moving floor 28 and feeder 24 as described above. The pumps 102 of the hydraulic control system are operated by a power takeoff from the truck's engine. Therefore, the truck's engine must be left running during operation. The operator selects whether to control the operation of the truck using the local or remote control panels 48 or 50 by rotating a switch 150 on the local control panel 48 (FIG. 8). "LOCAL" selects the local control panel 48 while "RADIO" selects the remote control panel 50.

The operator instructs the truck's engine to operate at "idle" or at a memorized RPM by selecting either "IDLE" or "RESUME" using switch 152. The RPM of the engine is increased or decreased by depressing buttons 154 or 156, respectively, on the control panel. The blower 34 is driven by a power takeoff from the engine, so increasing or decreasing the engine's RPM increases or decreases the speed at which the blower operates. Preferably, the truck engine is maintained at a constant RPM, and the speed of the blower is increase or decreased independent of the truck idle speed. As the speed of the blower 34 increases or decreases, the movement of air through the mixing chamber 32 increases or decreases. This in turn increases or decreases the distance that loose particulate material travels upon exiting the free end 44 of the hose 42. The volume of the air stream produced will vary, depending upon the application, however, an 800-1000 CFM volume blower has been found to produce advantageous results.

The feeder 24 is turned off, rotated forward or rotated in reverse by selecting "OFF," "F," or "R," respectively using switch 158. The speed at which the feeder rotates is increased or decreased by depressing buttons 160 or 162, respectively. Increasing or decreasing the speed of the feeder 24 increases or decreases the amount of loose particulate material fed into the mixing chamber 32 and exiting through the hose 44. Changing the direction of rotation of the feeder 24 helps to clear loose particulate material that becomes jammed within the feeder.

The moving floor 28 is operated either manually or automatically by making the appropriate selection using switch 164. If the "MANUAL" option is selected, the floor or moving floor 28 is turned on or off using switch 166. If "AUTO" is selected, the sensors 120 and 122 control the movement of the moving floor 28 as described above.

The augers 20 and mixer 22 are turned on or off using switch 168. The direction of the rotation of the augers 20 may be reversed by depressing switch 170. Reversing the direction of the augers 20 helps to clear loose particulate material from the feeder.

If the operator chooses to operate the truck using the remote control panel 50, switch 150 (FIG. 8) is set to "RADIO". The operator must also place the moving floor 28 in the automatic or manual mode using switch 164. The control panel 50 is switched on by depressing button 180 (FIG. 7). The control panel 50 includes a low battery indicator 182 and a transmit indicator 184.

The augers 20 and mixer 22 are turned on by depressing switch 168. The blower 34 is started by depressing the run key 190. The operator increases or decreases the RPM of the engine and blower by depressing keys 192 or 194, respectively. The engine may also be set at an idle position in which the blower is shut down by depressing key 196. The moving floor 28 is turned on or off by depressing keys 212 or 214, respectively. Rotation of the feeder 24 is started by depressing key 198. The speed of the feeder 24 is increased or decreased by depressing keys 200 or 202, respectively. The direction of rotation of the feeder 24 is changed between forward and reverse by depressing keys 204 or 206, respectively. The operation of the truck including the moving floor 28, augers 20, mixer 22, feeder 24, blower 34 and truck's engine may be stopped by depressing a kill switch 210.

When operating with either the local or remote control panels 48 or 50, it is advantageous that a water supply be attached to the water valve 96 and the water valve 96 be opened. Whenever the blower 34 and feeder 24 are operating, the control system instructs an electric solenoid water valve (not shown) operatively connected between the water valve 96 and the nozzle 40 to open. This allows water to flow through the nozzle 40 into the air stream produced by the blower 34. When the blower 34 and feeder 24 are turned off, the control system automatically shuts off the solenoid water valve.

Generally, an operator turns on the augers 20, mixer 22, blower 34, sets the operation of the moving floor 28 to automatic, and attaches a water supply to the water valve 96. As mentioned above, the water supply preferably comes mounted to the container truck 10. The operator adjusts the flow of the loose particulate material through the hose 42 by adjusting both the speed of the blower 34 and the speed of the feeder 24. Thus, the operator is able to adjust both the amount of loose particulate material exiting the free end of the hose and the distance of the loose particulate material.

Figure 10:
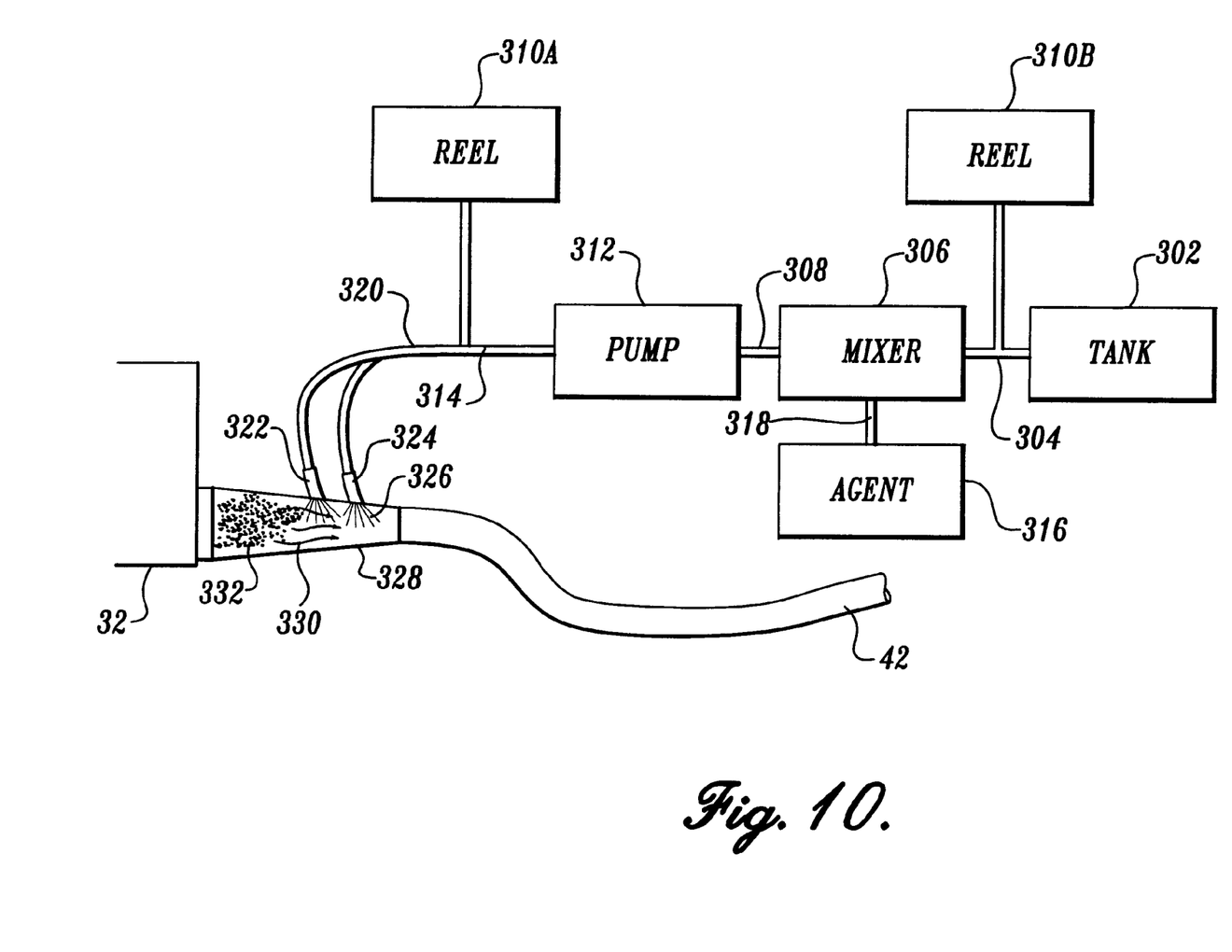
FIG. 10 is a schematic view of one embodiment of the present invention for introducing an agent into an air stream carrying the loose particulate material.

FIG. 10 shows a preferred embodiment for applying agents onto loose particulate material in accordance with the present invention. A carrier fluid may be contained in a vessel or tank 302 which may be located conveniently on the container truck (not shown). Tank 302 is suitably equipped to hold a quantity of carrier fluid, preferably the carrier fluid is water, however, air or any other fluid can be used as a suitable carrier fluid. When the carrier fluid is air, tank 302 may not be necessary, e.g. when air is the carrier fluid, the ambient atmosphere can provide the source of the carrier fluid. Alternatively, if there is a source of a carrier fluid at or near the site of application such as a faucet, tank 302 may not be necessary. A reel 310B having a hose of variable length may be provided to bring the carrier fluid from a remote carrier fluid source to the intake line 304. A hose reel such as is designated by reference numeral 310, is portable, and thus may reside between any of the components which comprise the system in order to meet any desired layout. It should be readily appreciated by the person of ordinary skill in the art, that there may be a plurality of hose reels whenever components are not situated proximate to one another.

Line 304 downstream of the tank 302 delivers carrier fluid to a mixer device 306. Tank 302 may have isolation valves at the outlet of the tank to line 304. Preferably, the mixer is kept simple such as an injection nozzle or union joint. However, mixer 306 may be a venturi-tube eductor for generating a low pressure region, wherein a liquid may be drawn to the low pressure region. An eductor is not necessarily required as any means that can draw a liquid from agent source 316 will be suitable for the purpose of mixing an agent containing liquid from agent source 316 with the carrier fluid, such as for example a pump or a siphoning tube. Alternatively, agent from agent source 316 may be gravity fed into the carrier fluid. In some instances, mixer 306 may simply be the union of the carrier fluid line 304 with the agent carrying line 318. The agent carrying line 318 may have flow metering means as well as flow measuring means to monitor the amount of agent introduced into the carrier fluid. Preferably a dosing pump (not shown) is used to deliver a controlled amount of agent into the carrier fluid. The dosing pump is situated on line 318, or suitably may act as the mixer 306. A flow measuring means may be provided on the carrier fluid lines 304 or 308 to monitor this flow as well. Having flow metering and flow measuring means to control both the carrier fluid and the agent carrying fluid will provide varying control options, such as, for example the amount of agent may be based on a specific ratio of carrier fluid to agent to achieve the optimum use of the agent. Preferably, the flow of the carrier fluid will be kept constant, while the amount of agent is controlled via a flow controller on the dosing pump. Mixer device 306 may be isolated at the inlet line 304 and the outlet line 308 and at the agent carrying line 318 with valves. As mentioned earlier, mixer 306 may be connected to a hose carried on a reel device 310B. The flexible hose is coiled on the reel 310B for storing and may be extended into a suitable length hose for delivery of the carrier fluid from sites at varying distances. For example, in embodiments where tank 302 is not carried by the container truck, the application site may be further from tank 302 than from the container truck. This could occur when tank 302 and/or mixer 306 and agent 316 are carried on an independent vehicle, separate from the container truck. Under some circumstances, agent 316 may be carried independently, therefore requiring a reel device from agent 316 to the mixer 306. Also, pump 312 may be carried on the same vehicle as tank 302 independent of the container truck, therefore requiring a reel device downstream of pump 312. As mentioned earlier, the hose and reel device 310B may replace tank 302 as the source of the carrier fluid. It should be readily apparent that when the individual components of the system are not situated proximate to the container truck or with respect to one another, a person of ordinary skill may provide for different installation configurations using not only a plurality of variable length hoses and reel devices, but a combination of hoses, hard-fitted pipe or tubing and valves dispersed between the individual components of the tank, pump, mixer and agent to meet the requirements of the particular application. Therefore, the placement of the reel device in any one position should not be read as limiting. Line 308 downstream of mixer connects mixer 306 to pump 312 so that the carrier fluid carrying agent can flow from mixer 306 to pump 312. Line 308 may be flexible or rigid. It should be readily appreciated that generally, all lines including 304, 308, 314, and 318 may be flexible or rigid piping, tubing or hose. There may be valves located between mixer 306 and pump 312 to isolate the mixer from the pump. There may also be valves located downstream of pump 312 to isolate pump 312 from the loose material stream. Generally, valves may be placed between any components of the system for isolation purposes or otherwise. Preferably, pump 312 is a positive displacement pump or any other pump that delivers a constant flow of carrier fluid when the carrier fluid is a liquid. However, any pump designed to meet the specifications for the particular application may be used. Alternatively, pump 312 may be controlled via a variable speed controller. Alternatively, the flow of carrier fluid may be adjusted via control valves and a recycle line (not shown) from the outlet line 314 of the pump discharge to the inlet line 308 of the pump suction. It should be readily appreciated that there are other well known means which pertain to controllers for controlling the flow and pressure of a fluid including restricting orifices, pressure regulators, valves, etc. that may be used to control the flow or pressure of the carrier fluid in this embodiment of the present invention.

When the carrier fluid is air, the pump can be a compressor. As with a pump, a compressor may be controlled via a controller for controlling the pressure and flow of the carrier fluid. As with the pump, the compressor may or may not be mounted to the container truck, but may be carried on a separate vehicle. As with the pump, a compressor may equally have valves on the discharge line 314 and the suction line 308.

The agent-containing carrier fluid passes into line 314. From line 314 the agent-containing carrier fluid may go to a reel device 310A or it may be injected directly into the loose particulate material stream. In one embodiment of the present invention, the agent-containing carrier fluid goes to reel 310A, where the reel can be uncoiled and the agent-containing carrier fluid may be applied directly onto loose particulate material which has already been distributed at the application site. The reel 310A may also be used to deliver the agent-containing carrier fluid to a distant loose particulate material stream, on perhaps another container truck. The agent-containing carrier fluid may also branch from line 314 into line 320 which then may optionally branch into two lines 322 and 324. The lines 322 and 324 communicate with a transition chamber 328 positioned between hose 42 and the outlet of mixing chamber 32. The shape of transition chamber 328 is not critical and may be chosen so that a smooth transition from the outlet of mixing chamber 32 to the inlet of hose 42 is provided. Preferably the cross-sectional area of transition chamber 328 at its entrance adjacent the outlet of mixing chamber 32 is greater than the cross-sectional area of transition chamber 328 at its outlet adjacent the entrance to hose 42 so that there is no significant pressure drop across transition chamber 328. Agent containing carrier fluid in lines 322 and 324 is introduced into transition chamber 328 where it mixes with the loose particulate material 322 carried by air stream 330. The agent containing carrier fluid may be introduced at an angle either concurrent or counter-current with the air stream 330 to increase the contact with the loose particulate material 332. Alternatively the entry angle may be perpendicular or at any angle to the air stream 330. As the agent containing carrier fluid is introduced into the air stream carrying the particulate material in transition chamber 328, the agent is dispersed and mixes intimately with the loose particulate material 332. The outlet of the agent containing lines 322 and 324 may have spray nozzles which further enhance the mixing with the loose particulate material. After leaving the transition chamber 328, the loose particulate material and the agent mix further in hose 42. It is preferable to provide a length of hose 42 sufficient to allow the loose particulate material to mix thoroughly with the agent thereby increasing the overall consistent distribution of the agent over the surface of the loose particulate material.

In an alternative embodiment, mixer 306 and agent source 316 can be omitted and the agent can be added directly to the carrier fluid in tank 302. Use of mixer 306 and agent source 316 is preferred from the standpoint of the ease in changing the type of agent that is introduced into the carrier fluid. In the embodiment where mixer 306 and agent source 316 are used, changing the type of agent introduced in the carrier fluid involves a simple task of draining the agent source 316 and providing a different source with a different agent. Because the agent in agent source 316 is preferably concentrated, the volume will be small compared to the volume of tank 302. However, agent may also be used in a prediluted state. If mixer 306 and agent source 316 are not employed, and the agent is added directly to tank 302, changing the type of agent that is applied to the particulate material would involve draining tank 302 which would generally be of a larger volume than agent source 316. Thus, storage of the unused carrier fluid/agent mixture in tank 302 would require larger volume and space.

In another embodiment, the locations of the mixer 306 and pump 312 are interchanged. In this embodiment, the pump would follow the tank 302 and the mixer would follow the pump. This might be advantageous when the mixer is an eductor. In this case, the pump would provide a propellant force to drive the eductor. The agent 316 would still feed into the mixer 306.

The present invention is particularly useful for the application of dyes to particulate material such as bark and wood chips. In addition, agents such as fumigants, pesticides, or fertilizers can be applied to loose particulate material in accordance with the present invention. Another embodiment of the present invention involves the application of microorganisms to compost, wherein the microorganisms facilitate the decomposition of the compost. In accordance with the present invention, the agent is preferably water soluble or readily dispensed in water.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for applying an agent onto loose particulate material comprising the steps of:
   providing an apparatus to pneumatically and continuously dispense the loose particulate material, the apparatus comprising a container for the loose particulate material, a feeder that regulates the flow of the loose particulate material out of the container, and a blower that produces an air stream that carries the loose particulate material,
   providing a carrier fluid,
   introducing the agent into the carrier fluid, wherein the agent is selected from the group consisting of dyes, pesticides, microorganisms and fumigants; and
   introducing the agent-containing carrier fluid at or downstream from the feeder carrying the loose particulate material.

2. The method according to claim 1, further comprising the step of providing a residence time for mixing the agent with the loose particulate material before dispensing and distributing the loose particulate material.

3. The method of claim 2, wherein the residence time is provided by passing the material through a hose.

4. The method of claim 1, wherein the carrier fluid is water or air.

5. The method of claim 1, wherein the agent is introduced manually into the carrier fluid.

6. The method of claim 1, wherein the agent is introduced into the carrier fluid by a differential pressure source.

7. The method of claim 1, wherein the particulate material comprises loose bark or wood chips.

8. The method of claim 7, wherein the agent is a dye.

9. An apparatus for applying an agent to loose particulate material comprising:
   a first container for holding the loose particulate material, a feeder that regulates the flow of the loose particulate material continuously out of the container, and a blower that produces an air stream that carries the loose particulate material,
   a source of a carrier fluid,
   a source of the agent, wherein the agent is selected from the group consisting of dyes, pesticides, microorganisms and fumigants, and a port for introducing the agent-containing carrier fluid at or downstream from the feeder carrying the loose particulate material.

10. The apparatus of claim 9, further comprising a conduit having residence time for mixing the agent with the loose particulate material before dispensing and distributing the loose particulate material.

11. The apparatus of claim 9, wherein the carrier fluid is water or air.

12. The apparatus of claim 9, further comprising a differential pressure source for introducing the agent into the carrier fluid.

13. The apparatus of claim 9, wherein the particulate material comprises loose bark or wood chips.

14. The apparatus of claim 13, wherein the agent is a dye.

15. The apparatus of claim 9, further comprising a mixer to mix the agent with the carrier fluid, said mixer being located downstream of the carrier fluid source and the agent source.

16. The apparatus of claim 9, further comprising a pump to propel the agent-containing carrier fluid to the air stream carrying the loose particulate material.

17. The apparatus of claim 9, further comprising a transition chamber, wherein the agent-containing carrier fluid is injected into the airstream carrying the loose particulate material at the transition chamber.

18. The apparatus of claim 9, further comprising a pump and an eductor, wherein the pump is located downstream of the carrier fluid source and the eductor mixes the agent with the carrier fluid.

* * * * *

UNITED STATES PATENT AND TRADEMARK OFFICE
CERTIFICATE OF CORRECTION

PATENT NO.   : 6,491,479 B1
DATED        : December 10, 2002
INVENTOR(S)  : A.L. Rexius

It is certified that error appears in the above-identified patent and that said Letters Patent is hereby corrected as shown below:

<u>Title page,</u>
*Assistant Examiner*, "Jeffery A Shapiro" should read -- Jeffrey A. Shapiro --

<u>Column 14,</u>
Line 10, "airstream" should read -- air stream --

Signed and Sealed this

Sixteenth Day of September, 2003

JAMES E. ROGAN
*Director of the United States Patent and Trademark Office*